UNITED STATES PATENT OFFICE.

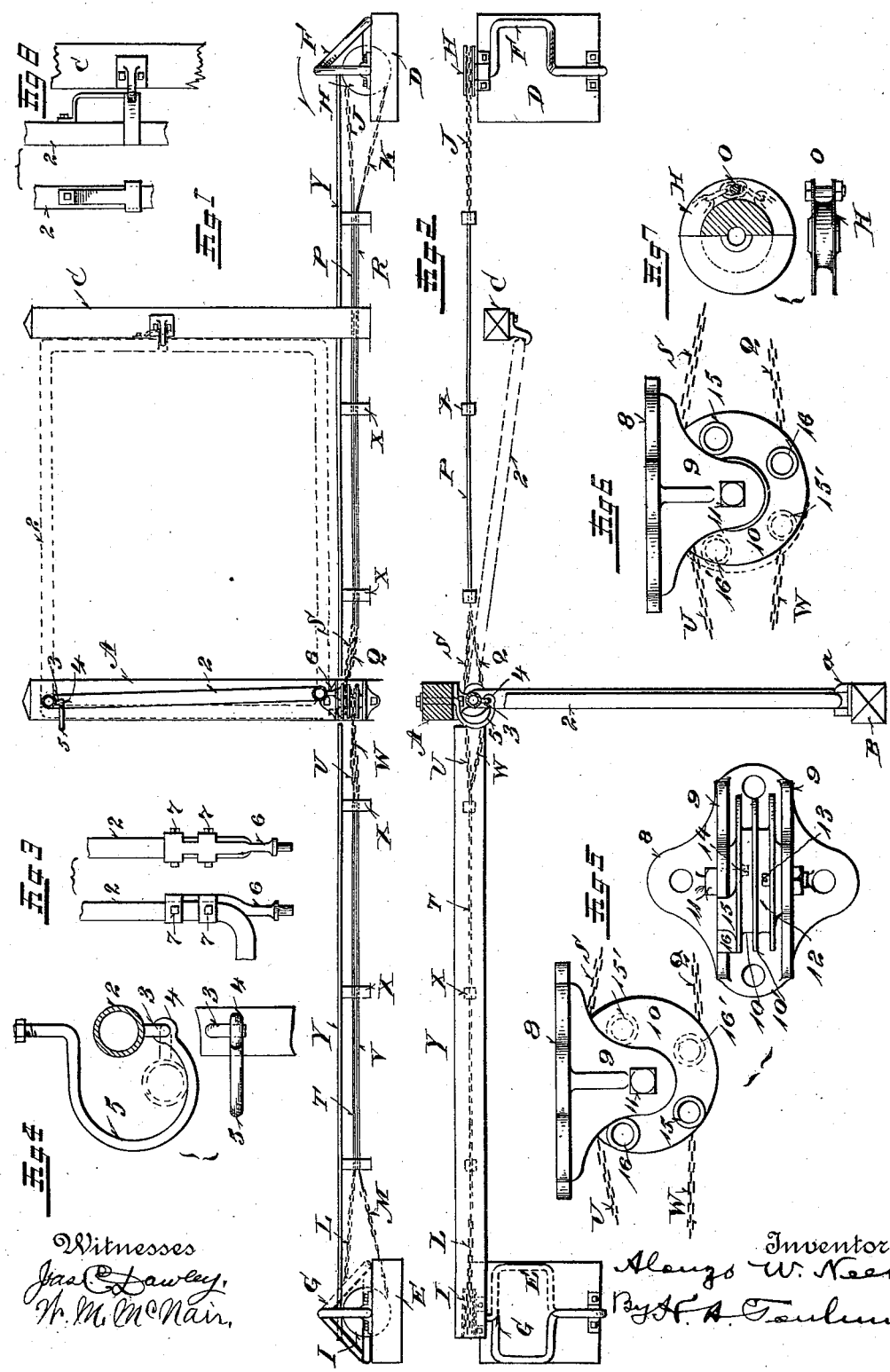

ALONZO W. NEER, OF CATAWBA, ASSIGNOR OF ONE-HALF TO CHARLES F. NEER, OF MECHANICSBURG, OHIO.

GATE.

SPECIFICATION forming part of Letters Patent No. 552,070, dated December 24, 1895.

Application filed March 25, 1895. Serial No. 543,044. (No model.)

*To all whom it may concern:*

Be it known that I, ALONZO W. NEER, a citizen of the United States, residing at Catawba, in the county of Clark and State of Ohio, have invented certain new and useful Improvements in Gates, of which the following is a specification, reference being had therein to the accompanying drawings.

My invention relates to an improvement in gates of the class wherein cranks or trips are operated by the wheels of vehicles to open and close the gate.

My improvements have reference to a new construction of pulley for shifting the lower inner corner of the gate from one side to the other of a central line, so that the gate will swing by gravity in first one direction and then the other, have reference to a new form of upper hinge for the gate, and have reference to other details hereinafter specified, and particularly pointed in the claims.

In the accompanying drawings, on which like reference letters and numerals indicate corresponding parts, Figure 1 is a side elevation of the gate embodying my improvements; Fig. 2, a plan view thereof; Fig. 3, a side and rear view of a portion of the gate and the lower hinge-pintle; Fig. 4, a plan and elevation of the upper hinge of the gate; Fig. 5, a plan and elevation of the gate-pulley and its bracket-casting; Fig. 6, a plan view of the pulley and its bracket-casting in another position; Fig. 7, a partial plan view and sectional view and edge view of one of the crank-pulleys, and Fig. 8 detail views of the catch and post.

A designates the hinge-post, B the latch-post, and C the holding-open or resting post.

Stout timbers D and E are partially buried in the ground and carry crank or trip shafts F and G, respectively, adapted to be operated through a quarter of a circle by the wheels of a vehicle, the crank F when driven to the left, as the gate is viewed in Fig. 1, and the crank G when driven to the right, as viewed in said figure. These crank-shafts carry, respectively, the pulleys H and I, to which are connected, respectively, the chains J and K and L and M. A bolt O passes through the flanges of these pulleys and through a link in the chains, and one chain or branch, J, goes over the pulley and the other, K, under the pulley. The same remarks apply to the chain or branch L and the branch M. An upper rod P connects with the chain J and with the inner side of the gate-pulley by a chain Q, and the chain K connects by a lower rod R through a chain S with the outer side of a gate-pulley. The chain L connects by a similar upper rod T through a chain U with the outer side of the gate-pulley, and the chain M connects by a lower rod V through a chain W with the inner side of the gate-pulley.

A number of posts X driven in the ground are slotted to receive and support the rods P R T V, and are covered by boards Y.

A gate 2 of any approved construction is provided with an upper pintle 3 which fits into an eye 4 in a curved hinge-arm 5 secured to the post A. The lower end of the gate is provided with pintle 6, bolted thereto, as shown at 7.

A casting 8 is bolted to the post A and carries between its wings 9 a pulley (which I term a "gate-pulley") 10 mounted on a bolt 11. This pulley has a groove 12 and a lug 13 on one side and a lug 14 on the other side. The chains U and S connect with the lug 14 and the chains Q and W connect with the lug 13. Thus it will be understood that when these chains are drawn upon the pulley 10 is rotated in one direction or the other, as will hereinafter appear. The pulley is provided with raised bosses 15 and 16 which act as stops against the wings 9 to limit the degree of rotation of the pulley. These bosses are socketed to receive the pintle 6 of the gate.

The normal position of the pintle 3 is shown in Figs. 2 and 4, and the normal position of the gate-pulley is shown in Figs. 2 and 6. In such normal position the axis of the lower pintle and its socket are somewhat to one side (the right) of the axis of the upper pintle to keep the gate closed against the post-stop *a* and to raise the gate up enough at the free end to cause it to unlatch. The socket 15 moves from such normal position to the dotted position 15'. This is the result of turning the crank F in the direction of the arrow by driving the wheel over it, the crank going down and the chain K, rod R, and chain S pulling, during which movement the gate swings to the right. Naturally this shifting of the lower pintle to one side would tend to let the gate sag down, but this is compensated for by the action of the upper pintle, which swings within the bent arm 5 with the gate-head. When the socket 15 reaches the position 15' the socket 16 reaches the position 16' and strikes the wing 9 and prevents further rotation of the gate-pulley.

Now when it is desired to close the gate, the wheel is driven against the crank G and the chain L, rod T and chain U are drawn upon. The result of this is to move the socket and lower pintle 6 from the dotted position 15' back to the original position 15, striking the wing 9, and preventing further rotation of the gate-pulley, which has the effect of elevating the free end of the gate so as to unlatch it, and to then close the gate. This I term opening the gate to the right and closing it to the left.

It will be observed that I have two sockets. These are for the purpose of both opening the gate to the right and closing it to the left, and opening it to the left and closing it to the right. The normal position for this latter purpose is shown in Fig. 5, and the change is made by transferring the pintle 6 from socket 15 to socket 16, and by changing the chains J and K to pass under the pulley H and over said pulley, respectively, on the trip F, and also by reversing the chains L and M, respectively, on the pulley I of the trip G. Hence if the crank F were now drawn upon the chain Q would be drawn on and the socket moving from the position 16 to the position 16' the gate would be lifted to unlatch it and the gate would be swung to the left.

If preferred the pulley 10 may have a flange 10' to divide the groove 12 into two parts to keep the chains apart.

Having thus fully described my invention, what I claim as new, and desire to scure by Letters Patent, is—

1. The combination with a swinging gate and a gate pulley with two sockets located in different positions in a circumferential direction, the lower pintle of the gate being adjustable into either socket to change the direction in which the gate will open, of two operating connections attached to opposite sides of the pulley, and cranks attached to said connections to draw upon one or the other of them when rotating.

2. The combination with a swinging gate and its latch post, of a pulley with a socket to receive the pintle on the lower end of the gate, and having a raised part to form a stop, and connections attached to opposite sides of said pulley, and means to operate said connections, and a bracket secured to the post and in which the pulley is mounted, and a flange or wing on the bracket against which said stop strikes.

3. The combination with a casting adapted to be secured to the gate post, of a pulley mounted therein and having raised bosses with sockets, the bosses acting as stops to strike the casting to limit the rotation of the pulley, and the sockets being adapted to receive the gate pintle.

4. The combination with a hinge post, a gate hinged thereto at its upper end by means of a pintle and a curved hinge-bar, a casting secured to the post with a gate pulley pivoted therein, two bosses on the pulley each with a socket adapted to receive the lower pintle of the gate, two chains connected to opposite sides of the pulley, cranks at either side of the gate, a pulley connected to each crank with a chain connected to opposite sides of each crank pulley, and intermediate connections between the gate pulley chains and the crank pulley chains.

In testimony whereof I affix my signature in presence of two witnesses.

ALONZO W. NEER.

Witnesses:
OLIVER H. MILLER,
W. M. McNAIR.